(12) United States Patent
Ookawa et al.

(10) Patent No.: US 12,497,326 B2
(45) Date of Patent: Dec. 16, 2025

(54) SURFACE-MODIFIED GLASS, ELECTRONIC COMPONENT, AND METHOD FOR FORMING SILICATE FILM

(71) Applicant: Murata Manufacturing Co., Ltd., Nagaokakyo (JP)

(72) Inventors: Noriyuki Ookawa, Nagaokakyo (JP); Yoshiyuki Nomura, Nagaokakyo (JP); Tomohiko Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1017 days.

(21) Appl. No.: 17/496,373

(22) Filed: Oct. 7, 2021

(65) Prior Publication Data
US 2022/0024814 A1 Jan. 27, 2022

Related U.S. Application Data

(63) Continuation of application No. PCT/JP2020/017226, filed on Apr. 21, 2020.

(30) Foreign Application Priority Data

May 24, 2019 (JP) .................. 2019-097689

(51) Int. Cl.
| | | |
|---|---|---|
| C03C 17/22 | (2006.01) | |
| C03C 3/04 | (2006.01) | |
| C03C 4/18 | (2006.01) | |
| C03C 17/23 | (2006.01) | |
| C09D 1/02 | (2006.01) | |
| C09K 3/18 | (2006.01) | |
| H01C 1/034 | (2006.01) | |
| H01F 27/32 | (2006.01) | |
| H01G 4/228 | (2006.01) | |

(Continued)

(52) U.S. Cl.
CPC ............... *C03C 17/22* (2013.01); *C03C 3/04* (2013.01); *C03C 4/18* (2013.01); *C09D 1/02* (2013.01); *H01G 4/228* (2013.01); *C03C 2204/00* (2013.01); *C03C 2218/111* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2002/0027764 A1 | 3/2002 | Kishimoto et al. | |
| 2002/0130318 A1* | 9/2002 | Kodama | H01C 17/06533 257/E29.1 |
| 2016/0027585 A1 | 1/2016 | Inoue et al. | |

FOREIGN PATENT DOCUMENTS

| | | | |
|---|---|---|---|
| JP | H0590080 A | | 4/1993 |
| JP | 05342907 A | * | 12/1993 |

(Continued)

OTHER PUBLICATIONS

Written Opinion of the International Searching Authority issued for PCT/JP2020/017226, date of mailing Jul. 14, 2020.

(Continued)

*Primary Examiner* — Ha S Nguyen
(74) *Attorney, Agent, or Firm* — ArentFox Schiff LLP (57) ABSTRACT

A surface-modified glass that includes glass containing at least one multivalent metal ion; and a silicate film on a surface of the glass, the silicate film containing a multivalent metal ion in common with that of the glass.

17 Claims, 4 Drawing Sheets

(51) Int. Cl.
*H01G 4/232* (2006.01)
*H01G 4/30* (2006.01)

(56) References Cited

FOREIGN PATENT DOCUMENTS

| | | | |
|---|---|---|---|
| JP | H06330028 A | 11/1994 |
| JP | H09194234 A | 7/1997 |
| JP | 2002043167 A | 2/2002 |
| JP | 2003206417 A | 7/2003 |
| JP | 2016031992 A | 3/2016 |

OTHER PUBLICATIONS

International Search Report issued for PCT/JP2020/017226, date of mailing Jul. 14, 2020.

* cited by examiner

FIG. 9

SURFACE-MODIFIED GLASS, ELECTRONIC COMPONENT, AND METHOD FOR FORMING SILICATE FILM

CROSS REFERENCE TO RELATED APPLICATIONS

The present application is a continuation of International application No. PCT/JP2020/017226, filed Apr. 21, 2020, which claims priority to Japanese Patent Application No. 2019-097689, filed May 24, 2019, the entire contents of each of which are incorporated herein by reference.

FIELD OF THE INVENTION

The present invention relates to surface-modified glass, an electronic component, and a method for forming a silicate film.

BACKGROUND OF THE INVENTION

It is known that when moisture adheres to a surface of glass, glass components such as metal ions are dissolved. For example, Patent Document 1 discloses that, in water repellent glass including a silicone resin film on a surface of a glass substrate, the silicone resin is subjected to hydrolysis due to an alkali component dissolved from the glass substrate, resulting in the deterioration in water repellency.
Patent Document 1: Japanese Unexamined Patent Application Publication No. 6-330028

SUMMARY OF THE INVENTION

The dissolution of glass components as described above can become a problem in electronic components such as multilayer ceramic capacitors. Glass may be present on a surface of a ceramic element body or outer electrodes constituting an electronic component such as a multilayer ceramic capacitor. In this case, when plating is performed on a surface of the outer electrodes or when the electronic component is used in a high-humidity environment, glass components may potentially be dissolved from a portion where glass is present on a surface thereof. When moisture enters the portion from which such glass components are dissolved, electrical insulation properties and lifetime characteristics are degraded, and as a result, the humidity resistance reliability of the electronic component is deteriorated.

As the method for preventing moisture from entering an electronic component, a method of forming a water repellent film on surfaces of an electronic component is proposed. By forming a water repellent film, even when glass components are dissolved, water repellency can be imparted to this portion. However, such a method of forming a water repellent film does not suppress the dissolution of glass components per se.

The above-described problem is not a problem limited to electronic components, but is a problem common across articles that can potentially experience the dissolution of glass components from glass present on surfaces of the articles.

The present invention was made to resolve the above-described problem and has an object to provide surface-modified glass including a silicate film disposed on a surface of glass, the silicate film being capable of suppressing the dissolution of glass components.

Furthermore, the present invention has objects to provide an electronic component including such a silicate film disposed on a surface of glass and to provide a method for forming such a silicate film on a surface of glass.

Surface-modified glass according to the present invention includes glass containing at least one multivalent metal ion; and a silicate film on a surface of the glass, the silicate film containing a multivalent metal ion in common with that of the glass.

An electronic component according to the present invention includes a ceramic element body having an outer surface; an electrode layer on at least a portion of the outer surface of the ceramic element body; glass on a surface of at least one of the ceramic element body and the electrode layer, wherein the glass contains at least one multivalent metal ion; and a silicate film on a surface of the glass, wherein the silicate film contains a multivalent metal ion in common with that of the glass.

A method for forming a silicate film according to the present invention includes applying a coating agent containing alkali metal silicate to a surface of glass that contains at least one multivalent metal ion; and forming a silicate film containing a multivalent metal ion in common with that of the glass on the surface of the glass through dissolution of the at least one multivalent metal ion in the glass to the surface of the glass.

In the present specification, the term "multivalent metal ion" refers to a metal ion having a valence of two or more.

According to the present invention, a silicate film capable of suppressing the dissolution of glass components can be formed on a surface of glass.

DETAILED DESCRIPTION OF THE PREFERRED EMBODIMENTS

Hereinafter, surface-modified glass, an electronic component, and a method for forming a silicate film according to the present invention will be described.

However, the present invention is not limited to the structures described below and can be applied with appropriate modifications within the scope that does not change the spirit of the present invention. A combination of two or more individual desirable structures described below is also construed as the present invention.

The drawings presented below are schematic and, for example, the scale of the size and aspect ratio may be different from the actual product.

[Surface-Modified Glass]

Figure 1:
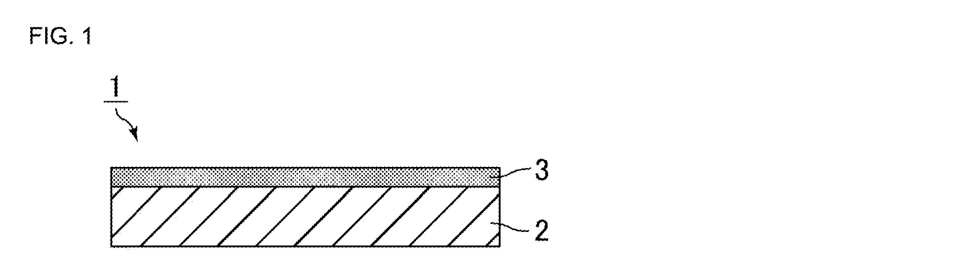
FIG. 1 is a lateral view schematically illustrating an example of surface-modified glass according to the present invention.

FIG. 1 is a lateral view schematically illustrating an example of surface-modified glass according to the present invention.

Surface-modified glass 1 illustrated in FIG. 1 includes glass 2 and a silicate film 3. The silicate film 3 is disposed on a surface of the glass 2.

The glass constituting the surface-modified glass according to the present invention contains at least one multivalent metal ion. Examples of an element forming the multivalent metal ion include at least one selected from the group consisting of Be, Mg, Ca, Sr, Ba, Al, Cr, Mn, Fe, Co, Ni, Cu, Zn, Ga, and Sn.

In the surface-modified glass according to the present invention, ions such as a multivalent metal ion contained in the glass can be confirmed by analyzing the composition of the surface-modified glass by transmission electron microscopy-energy dispersive X-ray spectroscopy (TEM-EDX) to thereby analyze the type of element contained in the glass. The valence of a multivalent metal ion contained in the glass may fluctuate, but it is sufficient to analyze the type of element contained in the glass, and it is not necessary to analyze the valence. The same method can be used for this confirmation in the cases of the electronic component and the method for forming a silicate film according to the present invention.

The glass constituting the surface-modified glass according to the present invention may further contain at least one monovalent metal ion. Examples of an element forming the monovalent metal ion include at least one selected from the group consisting of Li, Na, K, Rb, and Cs.

The type of the glass constituting the surface-modified glass according to the present invention is not particularly limited, but examples include borosilicate glass.

In the surface-modified glass according to the present invention, for example, the form of the glass is not particularly limited. The surface-modified glass according to the present invention encompasses articles where glass is present on a portion of a surface thereof and a silicate film is disposed on a surface of the glass.

The silicate film constituting the surface-modified glass according to the present invention contains a multivalent metal ion in common with the glass.

A method for forming the silicate film constituting the surface-modified glass is described later. In this case, the silicate film is formed through the reaction between a multivalent metal ion contained in the glass and a silicic acid ion and thus contains a multivalent metal ion derived from the glass.

Accordingly, examples of an element forming the multivalent metal ion contained in common in the glass and the silicate film include at least one selected from the group consisting of Be, Mg, Ca, Sr, Ba, Al, Cr, Mn, Fe, Co, Ni, Cu, Zn, Ga, and Sn.

In the surface-modified glass according to the present invention, ions such as a multivalent metal ion contained in the silicate film can be confirmed by analyzing the composition of the surface-modified glass by TEM-EDX to thereby analyze the type of element contained in the silicate film. The valence of a multivalent metal ion contained in the silicate film may fluctuate, but it is sufficient to analyze the type of element contained in the silicate film, and it is not necessary to analyze the valence. The same method can be used for this confirmation in the cases of the electronic component and the method for forming a silicate film according to the present invention.

In the surface-modified glass according to the present invention, the content of the multivalent metal ion contained in the silicate film is not particularly limited.

The interface of the silicate film and the glass can be confirmed by a sectional observation with a TEM. Thus, it is sufficient that in accordance with the above-described method, when the composition of the surface-modified glass is analyzed from a surface of the silicate film in the depth direction of the inside of the glass, whether the content of each ion is increased or decreased at the interface of the silicate film and the glass is confirmed.

The silicate film constituting the surface-modified glass according to the present invention may further contain at least one monovalent metal ion. The monovalent metal ion contained in the silicate film may or may not be in common with the glass.

The silicate film constituting the surface-modified glass according to the present invention may contain other glass components. For example, when the glass constituting the surface-modified glass according to the present invention is borosilicate glass, the silicate film may contain a B (boron) ion.

[Electronic Component]

An electronic component according to the present invention includes a ceramic element body and an electrode layer disposed on some of surfaces of the ceramic element body. In the electronic component according to the present invention, glass is present on a surface of at least one of the ceramic element body and the electrode layer, and a silicate film is disposed on a surface of the glass.

Hereinafter, a description will be made exemplifying a multilayer ceramic capacitor as an embodiment of the electronic component according to the present invention.

In the present invention, the electronic component is not limited to a chip component such as a multilayer ceramic capacitor, and may be a composite component such as a circuit module or may be an electronic substrate such as a circuit board or a multilayer board. Furthermore, the electrode constituted by an electrode layer is not limited to an outer electrode and may be any electrode. For example, the electrode may be a pad electrode, a land electrode, a coiled electrode, or a circuit pattern electrode. That is, the electronic component according to the present invention may be applied to a circuit of, for example, an electronic substrate, instead of only to an electrode such as an outer electrode.

Figure 2:
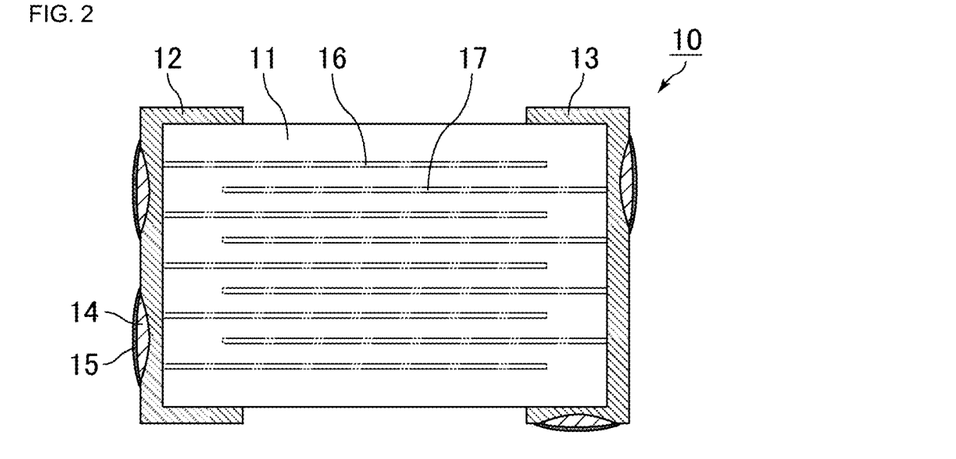
FIG. 2 is a lateral view schematically illustrating an example of a multilayer ceramic capacitor where glass is present on one or more surfaces of each outer electrode.

FIG. 2 is a lateral view schematically illustrating an example of a multilayer ceramic capacitor where glass is present on one or more surfaces of each outer electrode.

A multilayer ceramic capacitor 10 illustrated in FIG. 2 includes a rectangular or semi-rectangular ceramic element body 11 and outer electrodes 12 and 13 respectively disposed on first and second end surfaces of the ceramic element body 11.

In the multilayer ceramic capacitor 10 illustrated in FIG. 2, glass 14 is present on a portion of a surface of the outer electrodes 12 and a portion of surfaces of the outer electrode 13, and a silicate film 15 is disposed on a surface of the glass 14.

Inside the ceramic element body 11, a plurality of inner electrodes 16 and 17 alternately led out to the first and second end surfaces of the ceramic element body 11 are disposed. The inner electrodes 16 led out to the first end surface are coupled to the outer electrode 12 and the inner electrodes 17 led out to the second end surface are coupled to the outer electrode 13.

The ceramic element body 11 is composed of, for example, a ceramic material containing a metal oxide that contains titanium. Examples of such a metal oxide include $BaTiO_3$.

The outer electrodes 12 and 13 may each be constituted by a single electrode layer or by a plurality of electrode layers. The outer electrodes 12 and 13 may each be a baked electrode containing metal and glass or a resin electrode containing metal and resin. A plated electrode may be disposed on a surface of the baked electrode or the resin electrode.

In FIG. 2, the outer electrodes 12 and 13, wrap around not only the end surfaces of the ceramic element body 11 but also a portion of each of the upper and the lower surfaces of the ceramic element body 11, but it is sufficient that the outer electrodes 12 and 13 are disposed on any locations of the surfaces of the ceramic element body 11.

Figure 3:
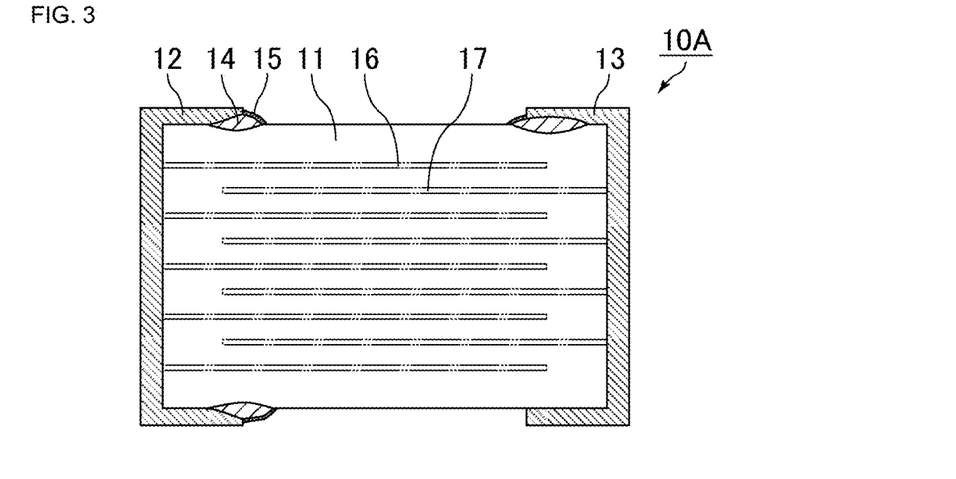
FIG. 3 is a lateral view schematically illustrating an example of a multilayer ceramic capacitor where glass is present on one or more boundary surfaces of each outer electrode and a ceramic element body.

FIG. 3 is a lateral view schematically illustrating an example of a multilayer ceramic capacitor where glass is present on one or more boundary surfaces of each outer electrode and a ceramic element body.

In a multilayer ceramic capacitor 10A illustrated in FIG. 3, the glass 14 is present on a portion of boundary surfaces of the outer electrode 12 and the ceramic element body 11 and on a portion of a boundary surface of the outer electrode 13 and the ceramic element body 11, and the silicate film 15 is disposed on a surface of the glass 14. The silicate film 15 is disposed on a surface of the glass 14 that is not covered by the outer electrode 12 or the outer electrode 13.

Figure 4:
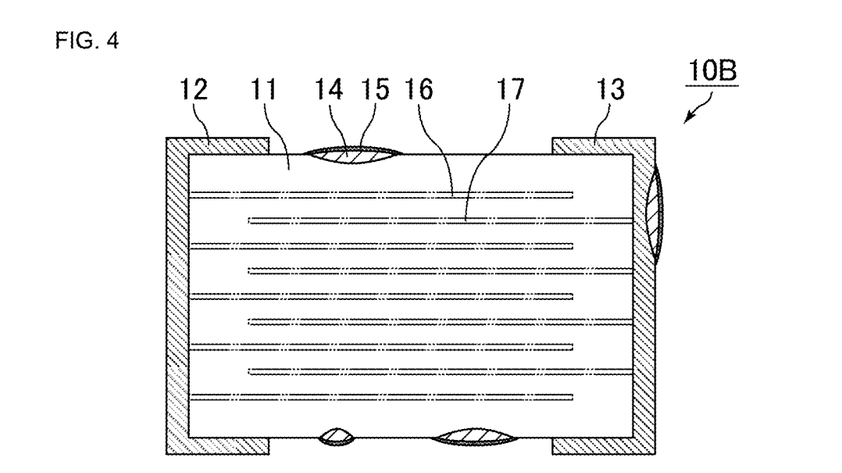
FIG. 4 is a lateral view schematically illustrating an example of a multilayer ceramic capacitor where glass is present on surfaces of a ceramic element body.

FIG. 4 is a lateral view schematically illustrating an example of a multilayer ceramic capacitor where glass is present on surfaces of a ceramic element body.

In a multilayer ceramic capacitor 10B illustrated in FIG. 4, the glass 14 is present on a portion of surfaces of the ceramic element body 11, and the silicate film 15 is disposed on a surface of the glass 14.

Figure 5:
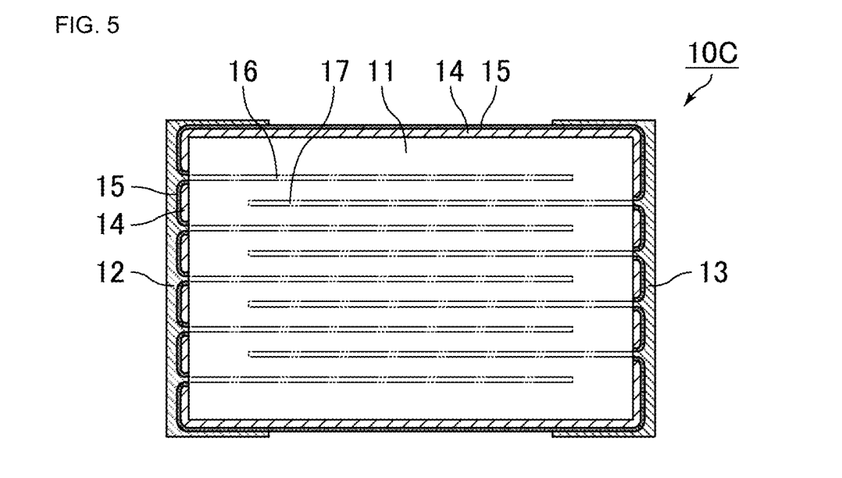
FIG. 5 is a lateral view schematically illustrating another example of a multilayer ceramic capacitor where glass is present on surfaces of a ceramic element body.

FIG. 5 is a lateral view schematically illustrating another example of a multilayer ceramic capacitor where glass is present on surfaces of a ceramic element body.

In a multilayer ceramic capacitor 10C illustrated in FIG. 5, the glass 14 is present on entire surfaces of the ceramic element body 11, and the silicate film 15 is disposed on a surface of the glass 14. However, of the surfaces of the ceramic element body 11, no glass 14 is present on portions where the outer electrode 12 and the inner electrodes 16 are coupled and portions where the outer electrode 13 and the inner electrodes 17 are coupled. The silicate film 15 is disposed also on a surface of the glass 14 that is covered by the outer electrode 12 or the outer electrode 13.

In the electronic component according to the present invention, it is sufficient that the silicate film is disposed on an outermost portion of the electronic component. Thus, the electronic component according to the present invention encompasses the cases where the silicate film is disposed on locations such as those illustrated in FIG. 6 below.

Figure 6:
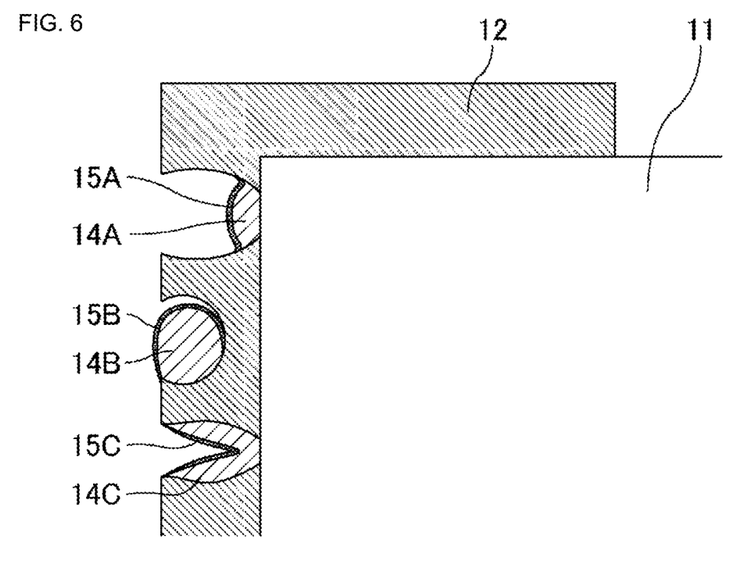
FIG. 6 is an enlarged lateral view schematically illustrating an example of a multilayer ceramic capacitor where glass is present on a surface of a ceramic element body or an outer electrode.

FIG. 6 is an enlarged lateral view schematically illustrating an example of a multilayer ceramic capacitor where glass is present on a surface of a ceramic element body or an outer electrode.

Glass 14A is present on a surface of the ceramic element body 11 and the outer electrode 12 at a location where a portion of the outer electrode 12 is absent, and a silicate film 15A is disposed on a surface of the glass 14A. Glass 14B is present on a surface of a location of the outer electrode 12, the location being where a portion of the outer electrode 12 is dented, and a silicate film 15B is disposed on a surface of the glass 14B. The silicate film 15B is in no contact with the outer electrode 12 and is apart therefrom. Glass 14C has a crack therein, and a silicate film 15C is disposed on a surface of the crack of the glass 14C.

The glass constituting the electronic component according to the present invention contains at least one multivalent metal ion. Examples of an element forming the multivalent metal ion include at least one selected from the group consisting of Be, Mg, Ca, Sr, Ba, Al, Cr, Mn, Fe, Co, Ni, Cu, Zn, Ga, and Sn.

The glass constituting the electronic component according to the present invention may further contain at least one monovalent metal ion. Examples of an element forming the monovalent metal ion include at least one selected from the group consisting of Li, Na, K, Rb, and Cs.

The type of the glass constituting the electronic component according to the present invention is not particularly limited, but examples include borosilicate glass.

The silicate film constituting the electronic component according to the present invention contains a multivalent metal ion in common with the glass.

The silicate film constituting the electronic component according to the present invention is preferably formed in accordance with the methods described herein. In this case, the silicate film is formed through the reaction between a multivalent metal ion contained in the glass and a silicic acid ion and thus contains a multivalent metal ion derived from the glass.

Accordingly, examples of an element forming the multivalent metal ion contained in common in the glass and the silicate film include at least one selected from the group consisting of Be, Mg, Ca, Sr, Ba, Al, Cr, Mn, Fe, Co, Ni, Cu, Zn, Ga, and Sn.

In the electronic component according to the present invention, the content of the multivalent metal ion contained in the silicate film is not particularly limited.

The silicate film constituting the electronic component according to the present invention may further contain at least one monovalent metal ion. The monovalent metal ion contained in the silicate film may or may not be in common with the glass.

The silicate film constituting the electronic component according to the present invention may contain other glass components. For example, when the glass constituting the electronic component according to the present invention is borosilicate glass, the silicate film may contain a B (boron) ion.

[Method for Forming Silicate Film]

A method for forming a silicate film according to the present invention includes applying a coating agent containing alkali metal silicate to a surface of glass that contains at least one multivalent metal ion. In the method for forming a silicate film according to the present invention, through dissolution of the at least one multivalent metal ion contained in the glass to the surface of the glass, a silicate film containing a multivalent metal ion in common with that of the glass is formed on the surface of the glass.

The method for forming a silicate film according to the present invention is characterized by the formation of a silicate film on a surface of glass employing the dissolution of a multivalent metal ion. The mechanism where a silicate film is formed is considered to be such that a silicic acid ion contained in the coating agent, due to the negative charge thereof being neutralized by the positive charge of a multivalent metal ion dissolved from the surface of the glass, loses the negative charge to thereby be precipitated. The mechanism is also considered to be such that through dissolution of the multivalent metal ion from the surface of the glass, the activity of water on the surface of the glass is lowered, resulting in the salting-out of the silicic acid ion contained in the coating agent.

By forming a silicate film on a surface of glass in accordance with the above-described method, the dissolution of glass components such as a multivalent metal ion to water or to an aqueous solution can be suppressed. As a result, dense glass is retained.

Because the silicate film is formed on a portion from which the multivalent metal ion is dissolved, the silicate film is evenly formed even when the form of the glass is complicated. Thus, regardless of the form of the object, the silicate film can be evenly formed.

The method for forming a silicate film according to the present invention may be applied when the glass is present on a portion of surfaces of the object. In this case, even when the coating agent is applied to entire surfaces of the object, the silicate film can be selectively formed only on a surface of the glass to which the multivalent metal ion is dissolved.

For example, the method for forming a silicate film according to the present invention further includes preparing an electronic component having a ceramic element body and an electrode layer on at least a portion of an outer surface of the ceramic element body, and where the glass is applied on a surface of at least one of the ceramic element body and the electrode layer.

When the method for forming a silicate film according to the present invention is applied to an electronic component, by suppressing the dissolution of glass components, the deterioration in the humidity resistance reliability of the electronic component as described herein can be prevented or reduced.

When the method for forming a silicate film according to the present invention is applied to an electronic component, the coating agent may be applied to all surfaces of the electronic component. By applying the coating agent to all the surfaces of the electronic component, the silicate film is selectively formed only on a surface of the glass. Thus, even when plating is performed on a surface of the electrode layer, the plating is not inhibited by the silicate film, thereby enabling good platability to be obtained.

The glass used in the method for forming a silicate film according to the present invention contains at least one multivalent metal ion. Examples of an element forming the multivalent metal ion include at least one selected from the group consisting of Be, Mg, Ca, Sr, Ba, Al, Cr, Mn, Fe, Co, Ni, Cu, Zn, Ga, and Sn.

The glass used in the method for forming a silicate film according to the present invention may further contain at least one monovalent metal ion. Examples of an element forming the monovalent metal ion include at least one selected from the group consisting of Li, Na, K, Rb, and Cs.

The type of the glass used in the method for forming a silicate film according to the present invention is not particularly limited, but examples include borosilicate glass.

The coating agent used in the method for forming a silicate film according to the present invention contains alkali metal silicate. As the alkali metal silicate, for example, a waterglass material such as lithium silicate, sodium silicate, or potassium silicate can be used. Furthermore, a reagent such as lithium silicate, sodium silicate, or potassium silicate may be used, or other water-soluble alkali metal silicates may be used. For example, a lithium silicate solution commercially available from Nissan Chemical Corporation, Nippon Chemical Industrial Co., Ltd., or the like can be used. The content of the alkali metal silicate in the coating agent is, for example, 0.1% to 50% by weight. Because the thinner the silicate film is, the less likely it is for water resistance to be enhanced, the content of the alkali metal silicate in the coating agent is preferably 0.1% by weight or more. On the other hand, because the higher the viscosity of the coating agent is, the less likely it is for the coating agent to enter the pores, the content of the alkali metal silicate in the coating agent is preferably 50% by weight or less.

The coating agent further contains a solvent. The coating agent preferably contains an inorganic solvent and more preferably contains inorganic and organic solvents.

Examples of the inorganic solvent include water. When the coating agent contains the inorganic solvent, the content of the inorganic solvent in the coating agent is, for example, 50% by weight to 99.9% by weight.

Examples of the organic solvent include water-soluble organic solvents such as alcohols and glycols. When the coating agent contains the organic solvent, the content of the organic solvent in the coating agent is, for example, 1% by weight to 30% by weight. Because the larger the amount of the organic solvent is, the less likely it is for the alkali metal silicate to be dissolved in the coating agent, the content of the organic solvent in the coating agent is preferably 30% by weight or less.

In addition to the alkali metal silicate and the solvent, the coating agent may contain, as additives, for example, a surface conditioner, a coupling agent, a glass etching agent, a curing catalyst for a silicate, and a filler. When the coating agent contains an additive, the additive may be one type alone or two or more types.

The surface conditioner is used to lower the surface tension of the coating agent. Examples of the surface conditioner include water-based silicones, alcohols, and glycols. When the coating agent contains the surface conditioner, the content of the surface conditioner in the coating agent is, for example, 0.01% by weight to 20% by weight. Because the higher the surface tension of the coating agent is, the more difficult it is for the silicate film to be formed in the pores, the content of the surface conditioner in the coating agent is preferably 0.01% by weight or more. On the other hand, because the larger the amount of the surface conditioner is, the less likely it is for the alkali metal silicate to be dissolved in the coating agent, the content of the surface conditioner in the coating agent is preferably 20% by weight or less.

The coupling agent is used to adjust the surface tension of the coating agent. When the coating agent contains the coupling agent, the content of the coupling agent in the coating agent is, for example, 0.01% by weight to 5% by weight.

Examples of the glass etching agent include fluoride ions and various complexing agents. Specific examples of the complexing agents include ethylenediamine, ethylenediaminetetraacetic acid, citric acid, oxalic acid, tartaric acid, thiourea, ammonia, acetic acid, lactic acid, malic acid, maleic acid, fumaric acid, glycols, and polyhydric alcohols. The acid may be of an H type or may be in the form of, for example, a sodium or a potassium salt as long as it is water-soluble, but a multivalent metal salt is not preferable because it precipitates silicic acid and an insoluble salt. When the coating agent contains the glass etching agent, the content of the glass etching agent in the coating agent is, for example, 1 ppm to 10,000 ppm. Because the larger the amount of the glass etching agent is, the more likely it is for glass components to be dissolved during the formation of a silicate film, the content of the glass etching agent in the coating agent is preferably 10,000 ppm or less.

Examples of the curing catalyst for a silicate include phosphoric acid, polyhydric alcohols, and multivalent transition metals. Specific examples of the curing catalyst for a silicate include pyrophosphoric acid, glyoxal, zinc chloride, copper chloride, iron chloride, and aluminum chloride. The acid may be of an H type or may be in the form of, for example, a sodium or a potassium salt as long as it is water-soluble, but a multivalent metal salt is not preferable because it precipitates silicic acid and an insoluble salt. Furthermore, the metal ion may be any negative ion species such as in the form of a sulfate, a chloride salt, or a carbonate, as long as it is water-soluble, but when the amount blended is large, it is not preferable due to the precipitation of silicic acid and an insoluble salt. When the coating agent contains the curing catalyst for a silicate, the content of the curing catalyst for a silicate in the coating agent is, for example, 1 ppm to 10,000 ppm. Because the larger the amount of the curing catalyst for a silicate is, the more likely it is for the storage stability (pot life) of the coating agent to be deteriorated, the content of the curing catalyst for a silicate in the coating agent is preferably 10,000 ppm or less.

The filler is preferably a filler that is dispersible in water and that is not dissolvable under alkali conditions with a silicate aqueous solution. Examples of such a filler include nanofillers such as zirconia and alumina. Other than these, the filler may be any filler such as silica, quartz, barium sulfate, calcium carbonate, titanium oxide, or mica as long as it is water-dispersible. When the coating agent contains a filler, the content of the filler in the coating agent is, for example, 1 ppm to 200,000 ppm. Because the larger the amount of the filler, the more likely it is for the film strength to be deteriorated, the content of the filler in the coating agent is preferably 200,000 ppm or less.

In the method for forming a silicate film according to the present invention, as the method for applying the coating agent to a surface of the glass, various technical methods such as immersion, spray coating, printing, and spin coating can be used.

To form a silicate film, the coating agent needs to be a liquid and needs to have a degree of low viscosity (e.g., 1 Pa·s or less). Thus, the treatment temperature for forming a silicate film is preferably a temperature ranging from a normal temperature to a temperature at which the coating agent boils, and is, for example, a normal temperature. The lower the treatment temperature is, the more likely it is for the reactivity to be deteriorated, and the higher the treatment temperature is, the more likely it is for the storage stability (pot life) of the coating agent to be deteriorated.

In the present specification, the term "normal temperature" refers to the temperature range defined by JIS Z 8703 and specifically to a temperature range of 5° C. to 35° C.

The treatment time for forming a silicate film is preferably 5 seconds to 24 hours and is, for example, 1 minute.

The surface tension of the coating agent is preferably 10 mN/m to 72 mN/m.

The pH of the coating agent is preferably 10 to 12.5.

The method for forming a silicate film according to the present invention preferably further includes a washing step after the silicate film is formed on a surface of the glass. Through the washing step, an excess amount of the coating agent can be washed off.

The method for forming a silicate film according to the present invention may further include a drying step after the washing step. Through the drying step, moisture can be removed.

In accordance with the method for forming a silicate film according to the present invention, a silicate film containing a multivalent metal ion in common with the glass is formed on a surface of the glass. That is, in accordance with the method for forming a silicate film according to the present invention, the surface-modified glass according to the present invention can be produced. Furthermore, by applying the method for forming a silicate film according to the present invention to an electronic component, the electronic component according to the present invention can be produced.

Because the silicate film formed in accordance with the method for forming a silicate film according to the present invention has the same structure as the silicate film described herein, a detailed description thereof will be omitted.

EXAMPLES

Hereinafter, Examples more specifically disclosing the surface-modified glass and the electronic component according to the present invention will be presented. The present invention is not limited to these Examples only.

Example 1

A coating agent containing 25% by weight of a lithium silicate solution and a balance of water was prepared. An about 1 cm-square glass substrate composed of borosilicate glass was prepared and was immersed in the coating agent at a normal temperature for 1 minute. The glass substrate was thereafter water-washed and dried to thereby produce a sample of Example 1.

Comparative Example 1

In the same manner as in the case of Example 1, an about 1 cm-square glass substrate composed of borosilicate glass was prepared. Unlike the case of Example 1, the glass substrate was used as it was as a sample of Comparative Example 1 without being immersed in the coating agent.

The samples of Example 1 and Comparative Example 1 were immersed in pure water at a normal temperature for 15 minutes. The amounts of Al, B, Ba, and Ca contained in the borosilicate glass dissolved to the pure water were quantified by inductively coupled plasma (ICP) emission spectrometry. The results are presented in Table 1.

TABLE 1

|  | Immersion in coating agent | Al g/L n = 1 | B g/L n = 1 | Ba g/L n = 1 | Ca g/L n = 1 |
| --- | --- | --- | --- | --- | --- |
| Example 1 | Performed | <0.0002 | <0.0002 | 0.0010 | <0.0002 |
| Comparative Example 1 | Not performed | 0.0013 | 0.0017 | 0.0139 | 0.0010 |

Table 1 reveals that in Example 1, the dissolution of the glass components is suppressed compared with the case of Comparative Example 1. This is conceivably because by immersing the glass substrate in the coating agent, a silicate film was formed on a surface of the glass.

Example 2

A multilayer ceramic capacitor was produced by forming baked electrodes containing copper and borosilicate glass as outer electrodes for a ceramic element body composed of BaTiO$_3$ as a base material. The obtained multilayer ceramic capacitor was immersed in the coating agent used in Example 1 at a normal temperature for 1 minute. The multilayer ceramic capacitor was thereafter water-washed and dried to thereby produce a sample of Example 2.

A TEM observation was performed on the outer electrode formed on the sample of Example 2 in accordance with the following method.

Through focused ion beam (FIB) processing, a sectional sample of a surface of the outer electrode was extracted and a TEM observation was performed thereon with a TEM (JEM-2200FS, manufactured by JEOL Ltd.). To avoid damage to the sample during FIB processing, Pt sputtering and carbon deposition were performed on the surface of the outer electrode before FIB processing.

Figure 7:
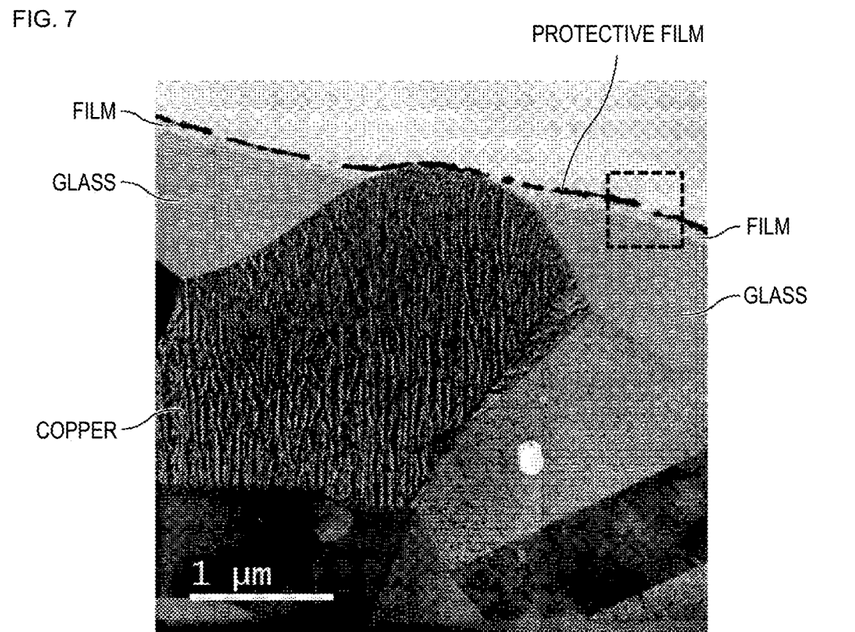
FIG. 7 is a TEM image presenting a portion of an outer electrode formed on a sample of Example 2.
Figure 8:
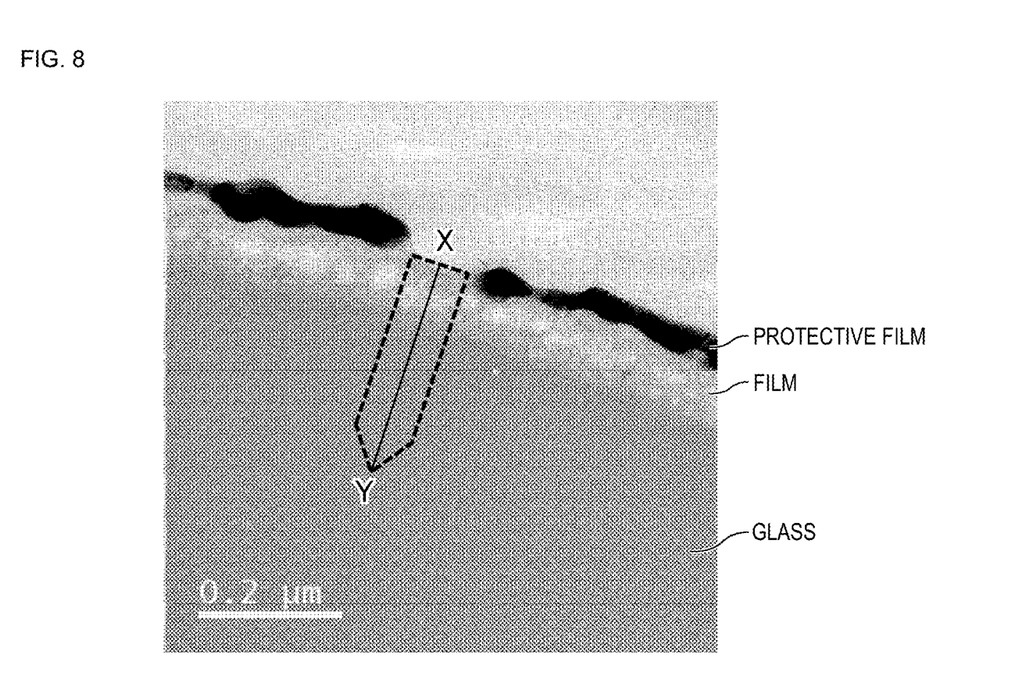
FIG. 8 is a TEM image in which the portion enclosed in the dashed box in FIG. 7 is enlarged.

FIG. 7 is a TEM image presenting a portion of the outer electrode formed on the sample of Example 2. FIG. 8 is a TEM image in which the portion enclosed in the dashed box in FIG. 7 is enlarged.

As presented in FIGS. 7 and 8, while a film is formed on a surface of the glass, no film is formed on a surface of the copper.

To investigate the composition in the depth direction, line analysis by EDX was performed in the direction of X to Y in FIG. 8 with the same apparatus as in the case of the TEM observation. The spot diameter was 1.0 nm and the cumulative number was 100 times.

Figure 9:
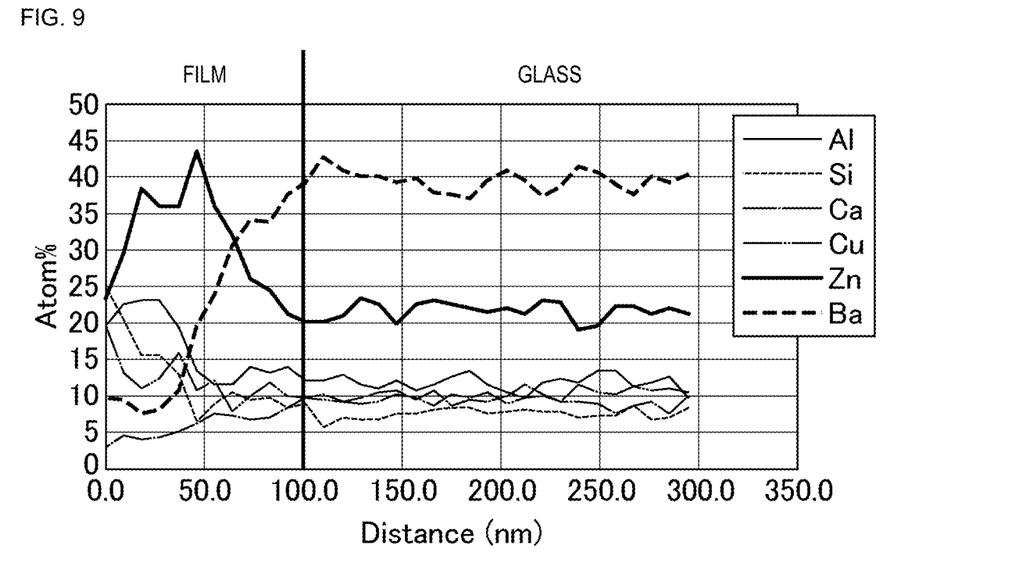
FIG. 9 is a graph presenting the compositions of a film and glass constituting the sample of Example 2.

FIG. 9 is a graph presenting the compositions of the film and the glass constituting the sample of Example 2.

It can be confirmed from FIG. 9 that the film contains the elements forming multivalent metal ions in common with the glass and that the content of each element is gradually changed across the boundary of the film and the glass. It is revealed that because the film contains Si, a silicate film is formed on a surface of the glass.

Of the elements forming the multivalent metal ions, in the case of Ca and Ba which are Group 2 elements, the content of Ca and Ba contained in the film positioned at the interface with the glass is smaller than the content of Ca and Ba contained in the glass positioned at the interface with the film. On the other hand, in the case of Al, Cu, and Zn which are elements other than Group 2 elements, the content of Al, Cu, and Zn contained in the film positioned at the interface with the glass is larger than the content of Al, Cu, and Zn contained in the glass positioned at the interface with the film.

Example 3

A coating agent containing 6% by weight of lithium silicate as the alkali metal silicate and 94% by weight of water as the inorganic solvent was prepared. The viscosity, surface tension, and pH of the coating agent were measured. The viscosity of the coating agent was measured with a viscometer (SV-10, manufactured by A&D Company, Ltd.). The surface tension of the coating agent was measured with a stalagmometer (in compliance with JIS K-3362, manufactured by Sogo Laboratory Glass Works Co., Ltd.). The pH of the coating agent was measured with a pH meter (manufactured by Horiba, Ltd.; a 6367-10D was used as a pH electrode).

A 10 mm-square glass substrate was prepared, and was immersed and left to stand in the coating agent at 25° C. for 1 minute. The glass substrate was thereafter water-washed and dried at 65° C. for 1 hour to thereby produce a sample of Example 3.

Example 4

The same procedure as in Example 3 was performed to thereby produce a sample of Example 4 except that the time during which the glass substrate was immersed and left to stand in the coating agent was changed to 5 minutes.

Example 5

The same procedure as in Example 3 was performed to thereby produce a sample of Example 5 except that the time during which the glass substrate was immersed and left to stand in the coating agent was changed to 15 minutes.

Example 6

The same procedure as in Example 3 was performed to thereby produce a sample of Example 6 except that the time during which the glass substrate was immersed and left to stand in the coating agent was changed to 30 minutes.

Example 7

The same procedure as in Example 4 was performed to thereby produce a sample of Example 7 except that the temperature at which the glass substrate was immersed and left to stand in the coating agent was changed to 15° C.

Example 8

The same procedure as in Example 4 was performed to thereby produce a sample of Example 8 except that the temperature at which the glass substrate was immersed and left to stand in the coating agent was changed to 35° C.

Example 9

The same procedure as in Example 4 was performed to thereby produce a sample of Example 9 except that a coating agent containing 1.2% by weight of lithium silicate as the alkali metal silicate and 98.8% by weight of water as the inorganic solvent was prepared.

Example 10

The same procedure as in Example 4 was performed to thereby produce a sample of Example 10 except that a coating agent containing 3% by weight of lithium silicate as the alkali metal silicate and 97% by weight of water as the inorganic solvent was prepared.

Example 11

The same procedure as in Example 4 was performed to thereby produce a sample of Example 11 except that a coating agent containing 12% by weight of lithium silicate as the alkali metal silicate and 88% by weight of water as the inorganic solvent was prepared.

Example 12

The same procedure as in Example 4 was performed to thereby produce a sample of Example 12 except that a coating agent containing 18% by weight of lithium silicate as the alkali metal silicate and 82% by weight of water as the inorganic solvent was prepared.

Example 13

The same procedure as in Example 4 was performed to thereby produce a sample of Example 13 except that a coating agent containing 12% by weight of lithium silicate as the alkali metal silicate, 3% by weight of butanol as the organic solvent, and a balance of water as the inorganic solvent was prepared.

Example 14

The same procedure as in Example 4 was performed to thereby produce a sample of Example 14 except that a coating agent containing 12% by weight of lithium silicate as the alkali metal silicate, 3,000 ppm of ethylenediaminetetraacetic acid (EDTA) as the glass etching agent, and a balance of water as the inorganic solvent was prepared.

Example 15

The same procedure as in Example 4 was performed to thereby produce a sample of Example 15 except that a coating agent containing 12% by weight of lithium silicate as the alkali metal silicate, 3,000 ppm of pyrophosphoric acid as the curing catalyst for a silicate, and a balance of water as the inorganic solvent was prepared.

Example 16

The same procedure as in Example 4 was performed to thereby produce a sample of Example 16 except that a coating agent containing 12% by weight of lithium silicate as the alkali metal silicate, 10,000 ppm of silica as the filler (SNOWTEX (registered trademark) ST-UP, manufactured by Nissan Chemical Corporation), and a balance of water as the inorganic solvent was prepared.

Example 17

The same procedure as in Example 4 was performed to thereby produce a sample of Example 17 except that a coating agent containing 12% by weight of lithium silicate as the alkali metal silicate, 3% by weight of butanol as the organic solvent, 3,000 ppm of ethylenediaminetetraacetic acid (EDTA) as the glass etching agent, 3,000 ppm of pyrophosphoric acid as the curing catalyst for a silicate, 10,000 ppm of silica as the filler (SNOWTEX (registered trademark) ST-UP, manufactured by Nissan Chemical Corporation), and a balance of water as the inorganic solvent was prepared.

Comparative Example 2

In the same manner as in the case of Example 3, a 10 mm-square glass substrate was prepared. Unlike the case of Example 3, the glass substrate was used as it was as a sample of Comparative Example 2 without being subjected to the treatment of being immersed and left to stand in the coating agent.

The samples of Examples 3 to 17 and Comparative Example 2 were immersed in 10 g of pure water and were left to stand in an oven at 60° C. for 2 hours. The samples were thereafter extracted and the amount of glass components dissolved to the pure water [mmol] was quantified by ICP emission spectrometry. Furthermore, in the case of Examples 3 to 17, to evaluate the suppressive effect on the amount of the glass components dissolved, the proportions of the amount dissolved in Examples 3 to 17 relative to the amount dissolved in Comparative Example 2 were calculated. The results are presented in Table 2.

TABLE 2

| | | Example 3 | Example 4 | Example 5 | Example 6 | Example 7 | Example 8 | Example 9 | Example 10 | Example 11 |
|---|---|---|---|---|---|---|---|---|---|---|
| Alkali metal silicate | Lithium silicate | 6 wt% | 6 wt% | 6 wt% | 6 wt% | 6 wt% | 6 wt% | 1.2 wt% | 3 wt% | 12 wt% |
| Inorganic solvent | Water | 94 wt% | 94 wt% | 94 wt% | 94 wt% | 94 wt% | 94 wt% | 98.8 wt% | 97 wt% | 88 wt% |
| Organic solvent | Butanol | — | — | — | — | — | — | — | — | — |
| Etching agent | EDTA | — | — | — | — | — | — | — | — | — |
| Curing catalyst | Pyrophosphoric acid | — | — | — | — | — | — | — | — | — |
| Filler | Silica | — | — | — | — | — | — | — | — | — |
| Treatment conditions | Temperature | 25° C. | 25° C. | 25° C. | 25° C. | 15° C. | 35° C. | 25° C. | 25° C. | 25° C. |
| | Time | 1 min | 5 min | 15 min | 30 min | 5 min | 5 min | 5 min | 5 min | 5 min |
| Liquid characteristics | Viscosity | 4 mPa·s | 4 mPa·s | 4 mPa·s | 4 mPa·s | 4 mPa·s | 4 mPa·s | 1.2 mPa·s | 1.5 mPa·s | 5 mPa·s |
| | Surface tension | 72 mN/m | 72 mN/m | 72 mN/m | 72 mN/m | 72 mN/m | 72 mN/m | 72 mN/m | 72 mN/m | 72 mN/m |
| | pH | 11.1 | 11.1 | 11.1 | 11.1 | 11.1 | 11.1 | 11.1 | 11.2 | 11.1 |
| Evaluation | Amount dissolved | 0.0003 | 0.0006 | 0.0003 | 0.0004 | 0.0002 | 0.0004 | 0.0116 | 0.0059 | 0.0008 |
| | Suppressive effect | 0.7% | 1.4% | 0.8% | 1.0% | 0.5% | 0.9% | 29% | 15% | 2.1% |

TABLE 2-continued

|  |  | Example 3 | Example 4 | Example 5 | Example 6 | Example 7 | Example 8 | Example 9 | Example 10 | Example 11 |
|---|---|---|---|---|---|---|---|---|---|---|
|  |  | Example 12 | Example 13 | Example 14 | Example 15 | Example 16 | Example 17 | Comparative Example 2 |
| Alkali metal silicate | Lithium silicate | 18 wt% | 12 wt% | 12 wt% | 12 wt% | 12 wt% | 12 wt% | No treatment |
| Inorganic solvent | Water | 82 wt% | Balance | Balance | Balance | Balance | Balance |  |
| Organic solvent | Butanol | — | 3 wt% | — | — | — | 3 wt% |  |
| Etching agent | EDTA | — | — | 3000 ppm | — | — | 3000 ppm |  |
| Curing catalyst | Pyrophosphoric acid | — | — | — | 3000 ppm | — | 3000 ppm |  |
| Filler | Silica | — | — | — | — | 10,000 ppm | 10,000 ppm |  |
| Treatment conditions | Temperature | 25° C. | 25° C. | 25° C. | 25° C. | 25° C. | 25° C. |  |
|  | Time | 5 min | 5 min | 5 min | 5 min | 5 min | 5 min |  |
| Liquid characteristics | Viscosity | 11 mPa·s | 4 mPa·s | 5 mPa·s | 5 mPa·s | 5 mPa·s | 4 mPa·s |  |
|  | Surface tension | 72 mN/m | 39 mN/m | 72 mN/m | 72 mN/m | 72 mN/m | 39 mN/m |  |
|  | pH | 10.9 | 11.1 | 11.2 | 11.2 | 11.1 | 10.9 |  |
| Evaluation | Amount dissolved | 0.0005 | 0.0005 | 0.0011 | 0.0007 | 0.0013 | 0.0024 | 0.0402 |
|  | Suppressive effect | 1.3% | 1.2% | 2.7% | 1.8% | 3.1% | 5.8% | — |

Table 2 reveal that in Examples 3 to 17, the dissolution of glass components is suppressed compared with the case of Comparative Example 2. Thus, it is conceivable that in the same manner as in the case of Example 1, by immersing the glass substrate in the coating agent, a silicate film was formed on a surface of the glass.

REFERENCE SIGNS LIST 1 surface-modified glass
2, 14, 14A, 14B, 14C glass
3, 15, 15A, 15B, 15C silicate film
10, 10A, 10B, 10C multilayer ceramic capacitor (electronic component)
11 ceramic element body
12, 13 outer electrode (electrode layer)
16, 17 inner electrode

The invention claimed is:

1. An electronic component comprising:
a ceramic element body having an outer surface;
an electrode layer on at least a portion of the outer surface of the ceramic element body;
glass on a surface of at least one of the ceramic element body and the electrode layer, wherein the glass contains at least one multivalent metal ion; and
a silicate film selectively formed on a surface of the glass, wherein the silicate film contains a multivalent metal ion in common with that of the glass.

2. The electronic component according to claim 1, wherein the glass is borosilicate glass.

3. The electronic component according to claim 1, wherein the at least one multivalent metal ion in the glass and the multivalent metal ion in the silicate film is at least one selected from the group consisting of Be, Mg, Ca, Sr, Ba, Al, Cr, Mn, Fe, Co, Ni, Cu, Zn, Ga, and Sn.

4. The electronic component according to claim 1, wherein the surface of the at least one of the ceramic element body and the electrode having the glass is a boundary surface between the electrode layer and the ceramic element body.

5. The electronic component according to claim 1, wherein the glass further contain at least one monovalent metal ion.

6. The electronic component according to claim 5, wherein the at least one monovalent metal ion is at least one selected from the group consisting of Li, Na, K, Rb, and Cs.

7. An electronic component comprising:
a ceramic element body having an outer surface;
an electrode layer on at least a portion of the outer surface of the ceramic element body;
glass on a surface of the ceramic element body, wherein the glass contains at least one multivalent metal ion; and
a silicate film selectively formed on a surface of the glass, wherein the silicate film contains a multivalent metal ion in common with that of the glass.

8. The electronic component according to claim 7, wherein the glass is borosilicate glass.

9. The electronic component according to claim 7, wherein the at least one multivalent metal ion in the glass and the multivalent metal ion in the silicate film is at least one selected from the group consisting of Be, Mg, Ca, Sr, Ba, Al, Cr, Mn, Fe, Co, Ni, Cu, Zn, Ga, and Sn.

10. The electronic component according to claim 7, wherein the surface of the ceramic element body is a boundary surface between the electrode layer and the ceramic element body.

11. The electronic component according to claim 7, wherein the glass further contain at least one monovalent metal ion.

12. The electronic component according to claim 11, wherein the at least one monovalent metal ion is at least one selected from the group consisting of Li, Na, K, Rb, and Cs.

13. An electronic component comprising:
a ceramic element body having an outer surface;
an electrode layer on at least a portion of the outer surface of the ceramic element body;
glass on a surface of at least one of the ceramic element body and the electrode layer, wherein the glass contains at least one multivalent metal ion; and
a silicate selectively formed on a surface of the glass, wherein the silicate film contains a multivalent metal ion in common with that of the glass;
wherein the at least one multivalent metal ion in the glass and the multivalent metal ion in the silicate film is at least one selected from the group consisting of Be, Mg, Sr, Ba, Al, Cr, Mn, Fe, Co, Ni, Cu, Zn, Ga, and Sn.

14. The electronic component according to claim 13, wherein the glass is borosilicate glass.

15. The electronic component according to claim 13, wherein the surface of the at least one of the ceramic element body and the electrode having the glass is a boundary surface between the electrode layer and the ceramic element body.

16. The electronic component according to claim 13, wherein the glass further contain at least one monovalent metal ion.

17. The electronic component according to claim 16, wherein the at least one monovalent metal ion is at least one selected from the group consisting of Li, Na, K, Rb, and Cs.

* * * * *